(12) United States Patent
Zhang

(10) Patent No.: US 11,731,727 B2
(45) Date of Patent: Aug. 22, 2023

(54) BICYCLE STEM STRUCTURE AND BICYCLE

(71) Applicant: Shenzhen COOGHI Funkids Technology Co., Ltd, Shenzhen (CN)

(72) Inventor: Jun Zhang, Shenzhen (CN)

(73) Assignee: SHENZHEN COOGHI FUNKIDS TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/867,706

(22) Filed: Jul. 19, 2022

(65) Prior Publication Data
US 2023/0057287 A1 Feb. 23, 2023

(30) Foreign Application Priority Data

Aug. 18, 2021 (CN) .......................... 202121946851.7

(51) Int. Cl.
*B62K 21/12* (2006.01)
*B62J 11/13* (2020.01)

(52) U.S. Cl.
CPC ............... *B62K 21/12* (2013.01); *B62J 11/13* (2020.02)

(58) Field of Classification Search
CPC ................................. B62K 21/12; B62J 11/13
See application file for complete search history.

(56) References Cited

U.S. PATENT DOCUMENTS

| | | | |
|---|---|---|---|
| 9,056,646 B1 * | 6/2015 | D'Aluisio | B62L 3/00 |
| 2006/0038377 A1 * | 2/2006 | Horiuchi | B62K 19/32 |
| | | | 280/276 |
| 2007/0108723 A1 * | 5/2007 | Fukui | B62K 19/32 |
| | | | 280/276 |
| 2015/0298759 A1 * | 10/2015 | Lanz | B62K 21/06 |
| | | | 280/279 |
| 2018/0118300 A1 * | 5/2018 | Lin | B62K 21/02 |
| 2019/0367122 A1 * | 12/2019 | Vandermolen | B60T 11/046 |
| 2021/0300501 A1 * | 9/2021 | Beistegui Chirapozu | |
| | | | B62K 21/16 |

FOREIGN PATENT DOCUMENTS

WO    WO 2009146552 A1 * 12/2009 ............. B62K 21/02
WO    WO 2019043575 A1 *  3/2019 ................ B62J 6/18

OTHER PUBLICATIONS

Machine translation of WO 2019043575 A1, Zbaren et al., Mar. 7, 2019 (Year: 2019).*

* cited by examiner

*Primary Examiner* — Vinh Luong

(57) ABSTRACT

The bicycle stem structure includes a mounting seat, a housing, and a vertical pipe. The housing includes a first connecting member extending toward a front wheel and a second connecting member extending toward a rear wheel. The vertical pipe is located in the first through hole. The vertical pipe is spaced apart from an inner wall of the first through hole and forms an annular cavity in communication with the second through hole. The vertical pipe is provided with a third through hole along an axial direction thereof. The mounting seat is connected to the vertical pipe and provided with at least two cable through holes through which cables are passed. At least one cable through hole is in communication with the third through hole, and at least one cable through hole is in communication with the annular cavity.

16 Claims, 5 Drawing Sheets

BICYCLE STEM STRUCTURE AND BICYCLE

CROSS REFERENCE TO RELATED APPLICATIONS

This application claims priority to Chinese patent application No. 202121946851.7, filed on Aug. 18, 2021. The contents of the above identified applications are hereby incorporated herein in their entireties by reference.

BACKGROUND

1. Technical Field

The present disclosure relates to the technical field of bicycle parts, and particular to a bicycle stem structure and bicycle.

2. Description of Related Art

A bicycle handlebar is a main control mechanism during use of a bicycle, which can change the direction of travel and the speed of travel of the bicycle. In addition to braking structures of conventional bicycles, shifting structures may be additionally mounted as required. It is known that most of the braking structures and shifting structures of the current bicycles are driven and controlled by cables, and many cables are exposed during use. On the one hand, during the rotation of the handlebar, multiple cables are easily entangled with each other and affect the use, on the other hand, friction of the cables with an outer structure of the bicycle can cause the cable sheath to rupture, reducing the service life of the braking mechanism or shifting mechanism.

BRIEF DESCRIPTION OF THE DRAWINGS

In order to more clearly illustrate the technical solutions in this embodiment disclosure, the drawings used in the embodiments or the description of the prior art will be briefly introduced below. It should be understood that, the drawings in the following description are only examples of the present disclosure. For those skilled in the art, other drawings can be obtained based on these drawings without creative works.

DETAILED DESCRIPTION

In order to make the objectives, technical solutions, and advantages of the present disclosure clearer, the present disclosure will be further described in detail below with reference to the drawings and embodiments. It should be understood that, the embodiments described herein are only for explaining the present disclosure and are not intended to limit the present disclosure.

It should be noted that, all directional indications (such as above, below, left, right, front, rear, etc.) in the embodiments of the present disclosure are merely used to explain the relative positional relationship, movement situation, and the like between various components under a certain posture (as shown in the accompanying drawings). If the certain posture changes, the directional indication changes accordingly.

In addition, descriptions involving "first", "second", etc. in the present disclosure are merely for descriptive purposes, and should not be construed as indicating or implying their relative importance or implicitly indicating the number of indicated technical features. Thus, features delimited with "first", "second" may expressly or implicitly include at least one of said features. In addition, the technical solutions between the various embodiments can be combined with each other, but must be based on the realization by those ordinary skilled in the art. When the combination of technical solutions is contradictory or cannot be realized, it should be considered that such combination of technical solutions does not exist and is not within the protection scope required by the present disclosure.

Figure 1:
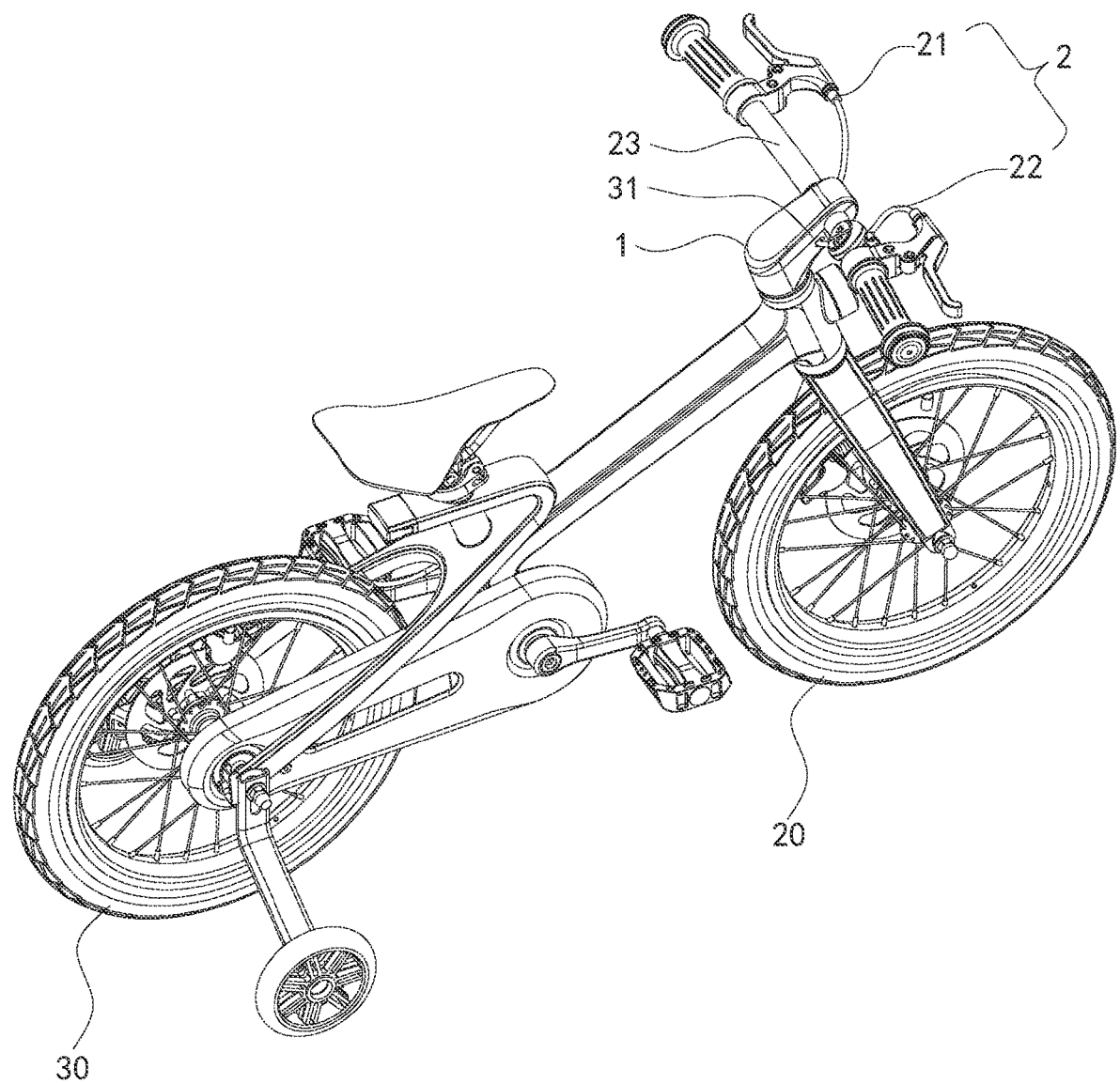
FIG. 1 is a schematic view of a bicycle according to an embodiment.

Referring to FIG. 1, the present disclosure provides a bicycle. The bicycle in this embodiment includes a brake assembly 2 and a bicycle stem structure 1. The brake assembly 2 can control a front brake and a rear brake, respectively, and plays a role in braking during the use of the bicycle. The bicycle stem structure 1, on one hand, can fix and support a handlebar 23, and on the other hand, can be connected to a front fork of the bicycle to control a direction of travel of a front wheel 20 of the bicycle.

Figure 2:
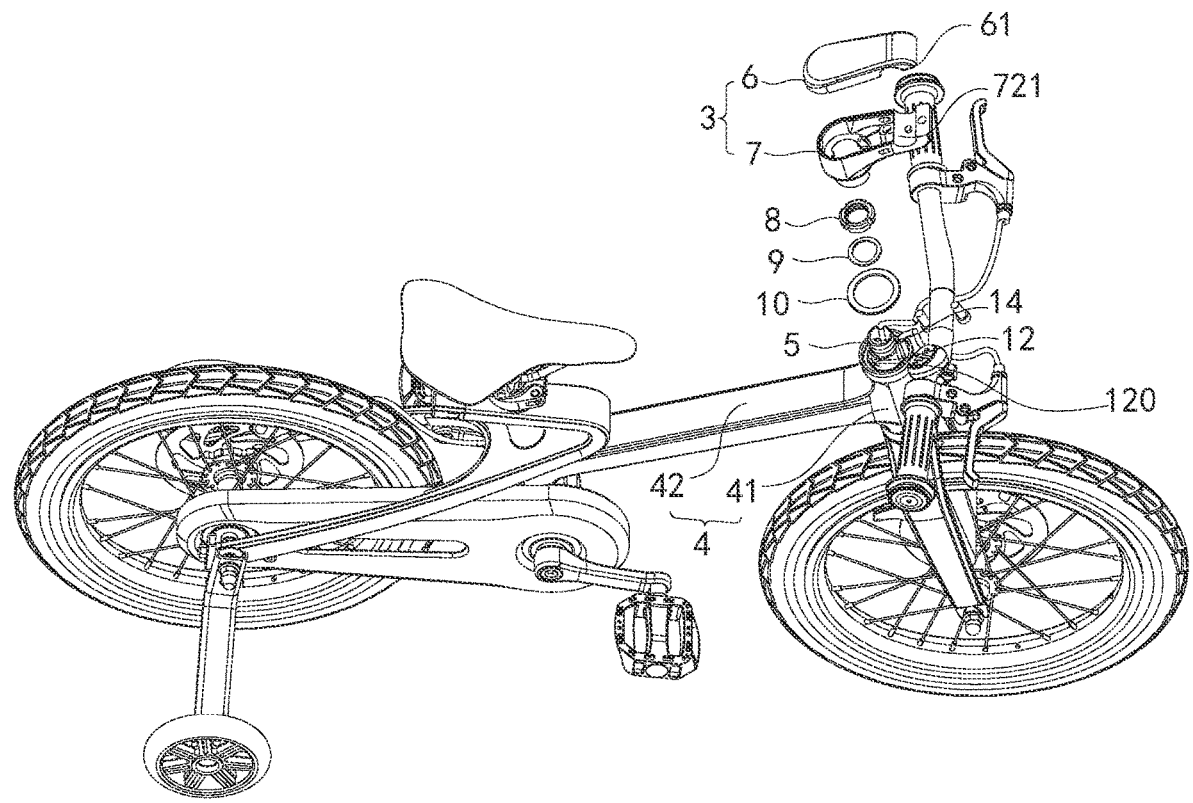
FIG. 2 is an exploded schematic view of a bicycle according to an embodiment.

The present disclosure also provides the bicycle stem structure 1, referring to FIG. 2, including a mounting seat 3, a housing 4, and a vertical pipe 5.

In an embodiment of the present disclosure, the housing 4 includes a first connecting member 41 extending toward the front wheel 20 and a second connecting member 42 extending toward a rear wheel 30. The first connecting member 41 is provided with a first through hole 12 along a length direction thereof, and the second connecting member 42 is provided with a second through hole 13 along a length direction thereof and in communication with the first through hole 12. Both the first connecting member 41 and the second connecting member 42 are hollow structures. In this embodiment, materials of the first connecting member 41 and the second connecting member 42 are not limited, and may be materials for housing common in the field, such as aluminum alloy, carbon fiber, and the like. When in use, cables can extend to the second through hole 13 through the first through hole 12 and be connected to the braking structure of the rear wheel 30 to achieve the function of internal wiring. The vertical pipe 5 is located in the first through hole 12, is spaced apart from an inner wall 120 of the first through hole 12, and forms an annular cavity 15 in communication with the second through hole 13. The vertical pipe 5 is provided with a third through hole 14 along an axial direction thereof. The annular cavity 15 and the third through hole 14 can allow the cables to freely pass through, ensuring that the cables have enough space for movement during use. The mounting seat 3 is connected to the vertical pipe 5 and is provided with at least two cable through holes 31 through which cables can be passed. In this embodiment, as shown in FIG. 2, one cable through hole 31 is in communication with the third through hole 14, and the other cable through hole 31 is in communication with the annular cavity 15. The cables can be connected to the rear wheel 30 through the first through hole 12 and can also be connected to the front wheel 20 through the third through hole 14, respectively through the cable through holes 31, so as to achieve the separation of different cables and reduce the possibility of the cables being entangled inside during use.

For the bicycle in the present disclosure, the brake assembly 2 includes a front brake cable 21, a rear brake cable 22, and a mechanical structure configured for driving the brake cables to move. The cables enter a cavity 16 of the mounting seat 3 after passing through the cable through holes 31. Such structure can make the overall appearance of the bicycle simple and beautiful, and prevent the cables from contacting other structures during use, causing damage to parts.

Figure 4:
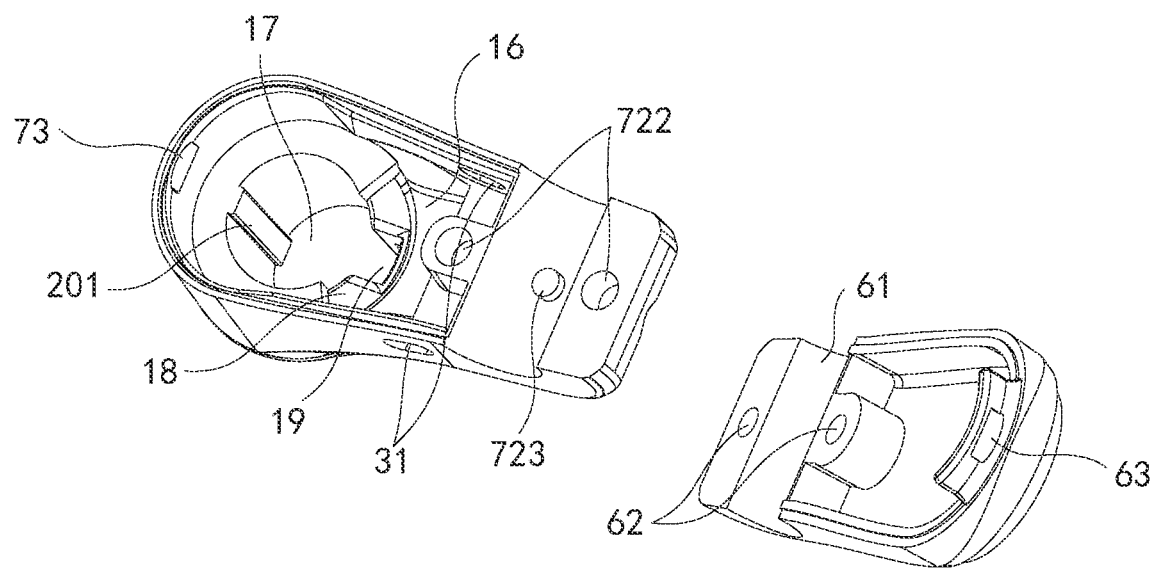
FIG. 4 is a schematic view of a mounting seat in FIG. 1.

In an embodiment of the present disclosure, referring to FIG. 4, the mounting seat 3 includes a seat body 7 connected to the vertical pipe 5 and a cover body 6 detachably covered on the seat body 7. The seat body 7 and the cover body 6 are enclosed to form the cavity 16 which is in communication with the cable through holes 31, the third through hole 14, and the annular cavity 15, respectively. In other embodiments, the cable through holes 31 may be positioned with a certain height difference, so that the cables do not contact each other in the cavity 16. A separation structure can also be additionally provided in the cavity 16, which can also achieve the purpose of separating the cables.

In an embodiment of the present disclosure, the seat body 7 includes a connecting portion 71 and a fixing portion 72 configured for fixing the handlebar 23. The connecting portion 71 includes an upper surrounding wall 711 defining the cavity 16 and a hollow column 712 connected to the upper surrounding wall 711 and in communication with the cavity 16. The hollow column 712 is connected to the vertical pipe 5. The hollow column 712 can ensure that the vertical pipe 5 is stably connected to the mounting seat 3 and cannot rotate or slip during use.

In an embodiment of the present disclosure, the hollow column 712 is provided with a mounting hole 17 and an avoiding groove 18 along an axial direction thereof, and the mounting hole 17 is in communication with the avoiding groove 18. The vertical pipe 5 is arranged in the mounting hole 17 and enclosed with the avoiding groove 18 to form the threading hole 19 which is in communication with the annular cavity 15. The cables inside the bicycle are generally made of metal materials, which is prone to fatigue fracture after the cables are bent for many times. The avoiding groove 18 can limit the cables, so that the cables can axially move along the cavity in the threading hole 19, and the cables are further prevented from being bent in the interior.

Figure 5:
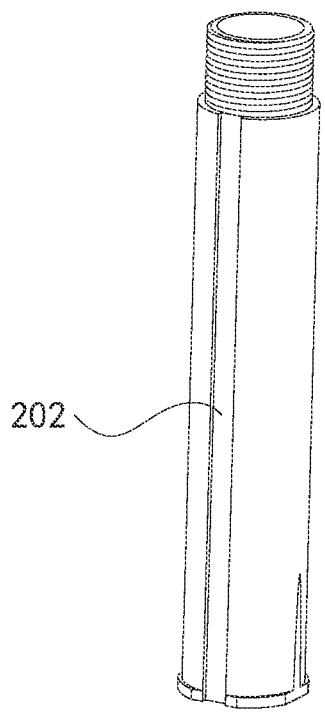
FIG. 5 is a schematic view of a vertical pipe in FIG. 1.

In an embodiment of the present disclosure, referring to FIG. 4, an inner wall of the hollow column 712 extends radially inward to form a first limiting protrusion 201. Referring to FIG. 5, the vertical pipe 5 is provided with a limiting groove 202 adapted to the first limiting protrusion 201. The first limiting protrusion 201 is clamped in the limiting groove 202, and the connection between the first limiting protrusion 201 and the limiting groove 202 can further ensure that the position of the vertical pipe 5 is fixed. The vertical pipe 5 may further be provided with a limiting plane 51 recessed radially, and the limiting plane 51 can be connected to other structures of the bicycle. It should be noted that the limiting method mentioned in this embodiment is only one of the embodiments, and other limiting means commonly used in the art should also be included in the protection scope of the present disclosure.

In an embodiment of the present disclosure, referring to FIG. 4, the cover body 6 is provided with a first groove 61 and at least one first connecting hole 62. The fixing portion 72 is provided with a second groove 721 corresponding to the position of the first groove 61 and at least one second connecting hole 722 corresponding to the position of the first connecting hole 62. A second limiting protrusion 723 is formed inside the second groove 721 by extending radially inward. The handlebar 23 extends through between the first groove 61 and the second groove 721. The second connecting hole 722 is connected to the first connecting hole 62 by bolts. The second limiting protrusion 723 is mainly used to fix the angle of the handlebar 23 to prevent twisting during use. It should be noted that the bolted connection is a common fixing method in the technical field, the purpose is to make the connection between the cover body 6 and the seat body 7 stably, and cannot be used as a limitation on the technical solution of the present disclosure.

In an embodiment of the present disclosure, referring to FIG. 4, the seat body 7 is provided with a clamping column 73, the cover body 6 is provided with a clamping groove 63 corresponding to the clamping column 73, and the clamping column 73 is detachably connected to the clamping groove 63 in a clamping manner. The purpose of the detachable clamping connection is to adjust the positional relationship between the cables during maintenance. To achieve the desired effect, the detachable connection structure can also be a threaded connection, hinge connection and other common detachable connection solutions in the technical field.

In an embodiment of the present disclosure, referring to FIG. 2, a nut 8 and a washer 9 configured for fixedly connecting the vertical pipe 5 and the mounting seat 3 are further included, and the nut 8 and the washer 9 are arranged in the cavity 16. In other embodiments, the nut 8 and the washer 9 can also be arranged outside the vertical pipe 5. In practical use, other connection manners not described in this embodiment, such as a snap connection, can also play the same role in the present disclosure.

Figure 3:
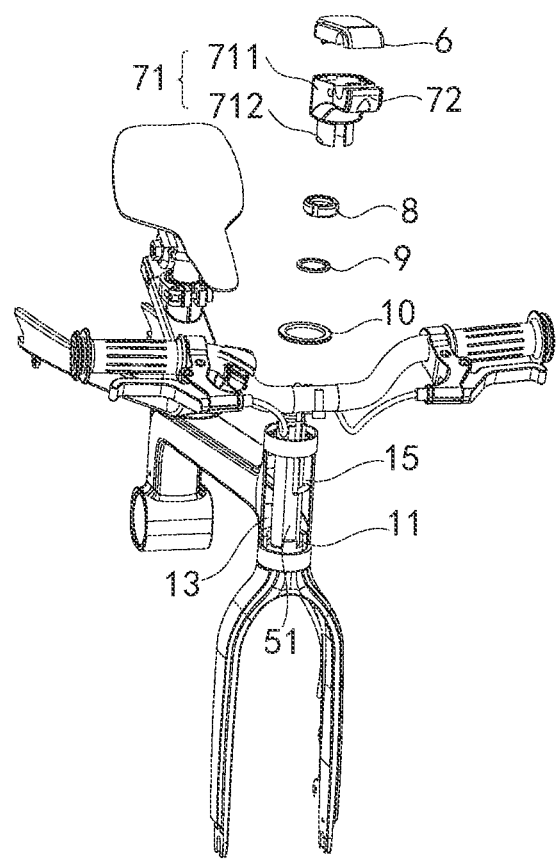
FIG. 3 is a partially exploded schematic view of a bicycle according to an embodiment.

In an embodiment of the present disclosure, referring to FIG. 3, a semi-arc-shaped protrusion 11 and a bearing 10 arranged on an inner wall of the first connecting member 41 are further included. The bearing 10 is sandwiched between the vertical pipe 5 and the semi-arc-shaped protrusion 11. The bearing 10 can ensure that the stem can rotate freely around the axis within the scope of use. The semi-arc-shaped protrusion 11 can not only realize the fixing effect with other components, but also further limit the movement direction of the cables. If the above expected effects can be achieved, other forms of fixing structures should also be included in the scope of the present disclosure.

The bicycle stem structure in the present disclosure forms different channels for different cables to pass through by separating the cooperation of the vertical pipe and the housing. Specifically, one cable can pass through one cable through hole and then pass through the third through hole, and the other cable can pass through the other cable through hole, sequentially pass through the threading hole and the annular cavity, and then pass through the second through hole. In this way, the complete separation of different cables is achieved, and the problems caused by cable entangled are fundamentally avoided. In addition, the threading hole and the avoiding groove are designed to prevent the cables from being bent, and to avoid the inner cable breakage caused by the rupture of the outer cable sheath during use.

The bicycle in the present disclosure uses the bicycle stem structure, which can prevent the entangled cables, prolong the service life of the brake and/or the shifter, and make the appearance more beautiful.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A bicycle stem structure, comprising a mounting seat, a housing, and a vertical pipe;
the housing comprising a first connecting member extending toward a front wheel and a second connecting member extending toward a rear wheel; the first connecting member being provided with a first through hole along a length direction thereof, and the second connecting member being provided with a second through hole along a length direction thereof and in communication with the first through hole;
the vertical pipe located in the first through hole, wherein the vertical pipe is spaced apart from an inner wall of the first through hole and forms an annular cavity in communication with the second through hole, the vertical pipe is provided with a third through hole along an axial direction thereof;
the mounting seat being connected to the vertical pipe and provided with two cable through holes; in which at least one cable through hole being in communication with the third through hole, and the other cable through hole being in communication with the annular cavity;
wherein the mounting seat comprises a seat body connected to the vertical pipe and a cover body detachably covered on the seat body, the seat body and the cover body are enclosed to form a cavity that is in communication with the cable through holes, the third through hole, and the annular cavity, respectively.

2. The bicycle stem structure of claim 1, wherein the seat body comprises a connecting portion and a fixing portion configured to fix a handlebar; the connecting portion comprises an upper surrounding wall defining the cavity and a hollow column connected to the upper surrounding wall and in communication with the cavity, the hollow column is connected to the vertical pipe.

3. The bicycle stem structure of claim 2, wherein the hollow column is provided with a mounting hole and an avoiding groove along an axial direction thereof, and the mounting hole is in communication with the avoiding groove; the vertical pipe is arranged in the mounting hole and enclosed with the avoiding groove to form a threading hole that is in communication with the annular cavity.

4. The bicycle stem structure of claim 2, wherein an inner wall of the hollow column extends radially inward to form a first limiting protrusion, the vertical pipe is provided with a limiting groove adapted to the first limiting protrusion, the first limiting protrusion is clamped in the limiting groove.

5. The bicycle stem structure of claim 2, wherein the cover body is provided with a first groove and at least one first connecting hole, the fixing portion is provided with a second groove corresponding to a position of the first groove and at least one second connecting hole corresponding to a position of the first connecting hole; a second limiting protrusion is formed inside the second groove by extending radially inward; the handlebar extends through between the first groove and the second groove, the second connecting hole is connected to the first connecting hole by a bolt.

6. The bicycle stem structure of claim 1, wherein the seat body is provided with a clamping column, the cover body is provided with a clamping groove corresponding to the clamping column, and the clamping column is detachably connected to the clamping groove in a clamping manner.

7. The bicycle stem structure of claim 1, further comprising a nut and a washer configured to fixedly connect the vertical pipe and the mounting seat, and the nut and the washer being arranged in the cavity.

8. The bicycle stem structure of claim 1, further comprising a semi-arc-shaped protrusion and a bearing arranged on an inner wall of the first connecting member, the bearing being sandwiched between the vertical pipe and the semi-arc-shaped protrusion.

9. A bicycle stem structure, comprising a mounting seat, a housing, and a vertical pipe;
the housing comprising a first connecting member extending toward a front wheel and a second connecting member extending toward a rear wheel; the first connecting member being provided with a first through hole along a length direction thereof, and the second connecting member being provided with a second through hole along a length direction thereof and in communication with the first through hole;
the vertical pipe located in the first through hole, wherein the vertical pipe is spaced apart from an inner wall of the first through hole and forms an annular cavity in communication with the second through hole, the vertical pipe is provided with a third through hole along an axial direction thereof;
the mounting seat being connected to the vertical pipe and provided with two cable through holes; in which one cable through hole being in communication with the third through hole, and the other cable through hole being in communication with the annular cavity;
wherein the bicycle stem structure further comprises a semi-arc-shaped protrusion and a bearing arranged on an inner wall of the first connecting member, the bearing being sandwiched between the vertical pipe and the semi-arc-shaped protrusion.

10. The bicycle stem structure of claim 9, wherein the mounting seat comprises a seat body connected to the vertical pipe and a cover body detachably covered on the seat body, the seat body and the cover body are enclosed to form a cavity that is in communication with the cable through holes, the third through hole, and the annular cavity, respectively.

11. The bicycle stem structure of claim 10, wherein the seat body comprises a connecting portion and a fixing portion configured to fix a handlebar; the connecting portion comprises an upper surrounding wall defining the cavity and a hollow column connected to the upper surrounding wall and in communication with the cavity, the hollow column is connected to the vertical pipe.

12. The bicycle stem structure of claim 11, wherein the hollow column is provided with a mounting hole and an avoiding groove along an axial direction thereof, and the mounting hole is in communication with the avoiding groove; the vertical pipe is arranged in the mounting hole and enclosed with the avoiding groove to form a threading hole that is in communication with the annular cavity.

13. The bicycle stem structure of claim 11, wherein an inner wall of the hollow column extends radially inward to form a first limiting protrusion, the vertical pipe is provided with a limiting groove adapted to the first limiting protrusion, the first limiting protrusion is clamped in the limiting groove.

14. The bicycle stem structure of claim 11, wherein the cover body is provided with a first groove and at least one first connecting hole, the fixing portion is provided with a second groove corresponding to a position of the first groove and at least one second connecting hole corresponding to a position of the first connecting hole; a second limiting protrusion is formed inside the second groove by extending radially inward; the handlebar extends through between the first groove and the second groove, the second connecting hole is connected to the first connecting hole by a bolt.

15. The bicycle stem structure of claim 10, wherein the seat body is provided with a clamping column, the cover body is provided with a clamping groove corresponding to the clamping column, and the clamping column is detachably connected to the clamping groove in a clamping manner.

16. The bicycle stem structure of claim 10, further comprising a nut and a washer configured to fixedly connect the vertical pipe and the mounting seat, and the nut and the washer being arranged in the cavity.

* * * * *